US006914872B2

United States Patent
Tanaka

(10) Patent No.: US 6,914,872 B2
(45) Date of Patent: Jul. 5, 2005

(54) OPTICAL PICKUP AND HIGH-FREQUENCY SUPERPOSITION MODULE THEREFOR

(75) Inventor: Masamichi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 478 days.

(21) Appl. No.: 10/078,371

(22) Filed: Feb. 21, 2002

(65) Prior Publication Data

US 2002/0163875 A1 Nov. 7, 2002

(30) Foreign Application Priority Data

Feb. 22, 2001 (JP) ........................................ 2001-047249

(51) Int. Cl.$^7$ ................................................. G11B 7/00
(52) U.S. Cl. ................................................. 369/116
(58) Field of Search ........................... 369/47.17, 53.26, 369/116, 53.25, 53.11, 47.49, 47.5

(56) References Cited

U.S. PATENT DOCUMENTS 5,086,420 A * 2/1992 Doi ........................... 369/44.25
5,566,142 A * 10/1996 Nakano et al. ............. 369/122
6,385,219 B1 * 5/2002 Sonoda ......................... 372/28

FOREIGN PATENT DOCUMENTS

| JP | 59-9086 | 2/1984 |
| JP | 7-93758 | 4/1995 |

* cited by examiner

Primary Examiner—Paul W. Huber
(74) Attorney, Agent, or Firm—Oblon, Spivak, McClelland, Maier & Neustadt, P.C.

(57) ABSTRACT

A high-frequency superposition module for an optical pickup that reduces the number of devices, facilitates scale-down and allows an oscillating circuit to be turned off when a power supply for feeding a direct current to a laser diode is turned off and an optical pickup using the high-frequency superposition module. An oscillating circuit for feeding a high frequency to a laser diode comprises at least an active element and passive elements such as capacitors, resistors, and inductors. A power supply for feeding a direct current to the laser diode is also used as a power supply for the oscillating circuit.

6 Claims, 6 Drawing Sheets

OPTICAL PATH DIFFERENCE (mm)

OPTICAL PICKUP AND HIGH-FREQUENCY SUPERPOSITION MODULE THEREFOR

BACKGROUND OF THE INVENTION

The present invention relates to an optical pickup provided in information recording/playback apparatus using optical recording media such as a DVD, MD and CD and a high-frequency superposition module.

A laser diode used as a laser light source of an optical pickup is driven in the single mode when it is driven by a direct current. The single mode basically means that a single optical output of a particular wavelength is obtained. However, when the laser diode is driven in the single mode, a rise in the temperature of the laser diode gradually shifts the center of oscillating wavelength toward the longer wavelength at certain wavelength intervals. The variation in the oscillating wavelength is called the mode popping and a noise generated by the mode popping is called the popping noise. In the case of a laser diode used for DVDs, the oscillating wavelength is 650 nm and the mode interval is 0.1 nm. The initial wavelength of 650 at activation varies for example to 650.1 nm due to a rise in temperature. Mode popping often occurs when the temperature of the diode varies. Thus mode popping may be regarded as a laser noise associated with variation in temperature.

Optical output from a laser diode is the sum of the outputs of oscillating wave length modes as longitudinal modes. Optical output is more likely to vary so that a noise is more likely to occur due to variations in temperature in the single mode where a single oscillating wavelength is used than in the multimode where a number of oscillating wavelength are used.

For such a reason, for example, the Japanese patent Publication JP-B-59-9086/(1984) discloses superposition a high-frequency superposition module current on a direct current that drives a laser diode to drive the laser diode in the multi mode. FIG. 6A shows the block diagram of a related art circuit configuration of a high-frequency superposition module that drives a laser diode with this high frequency superposed. FIG. 6B is a circuit diagram of FIG. 6A.

In FIGS. 6A and 6B, a numeral 1 represents a laser diode, 2 a photo-detector diode, and 3 a high-frequency superposition module for driving these diodes. The high-frequency superposition module 3 has a power supply terminal 4 for feeding power to drive the photo-detector diode 2, a power supply terminal 5 for feeding a direct current to the laser diode 1 via a filter 6, an oscillating circuit 7 for feeding a high-frequency current to the laser diode 1, a direct current power supply terminal 8 of the oscillating circuit 7, a filter 9 for preventing the oscillating high frequency from being fed back to the power supply terminal 8, and an impedance matching circuit 10 for providing impedance matching with the circuit on the side on the laser diode 1 and preventing reflection.

As shown in FIG. 6B, the filters 6, 9 are composed of inductors L3, L4, respectively. The oscillating circuit 7 is composed of a transistor Q1, capacitors C1 through C3 and C6, inductors L1, L2, and resistors R1 through R3. The impedance matching circuit 10 is composed of capacitors C4, C5.

The oscillating circuit 7 composes an oscillating circuit that uses an LC resonance phenomenon. The oscillating circuit 7 oscillates at a frequency of several hundreds megahertz and superposes a high frequency on a direct current from the power supply terminal 5 thus driving the laser diode 1. Optical output generated by the laser diode 1 has peaks in a plurality of wavelengths of predetermined wavelength intervals. The envelope of the peaks forms the shape of a crest. That is, multiple longitudinal modes for a laser beam are used to prevent the mode popping noise.

In the circuit of the FIG. 6B, a power supply connected to the power supply terminal 5 for feeding a direct current to the laser diode 1 is separate from the power supply of the oscillating circuit 7 connected to the power supply terminal 8. Thus, turning off the laser diode 1 does not halt continuous operation of the oscillating circuit 7. To halt the operation, it is necessary to provide a power switch of the oscillating circuit 7 apart from the power switch for feeding a direct current to the laser diode 1, and to turn on/off theses switches at the same time.

As mentioned above, a related art high-frequency superposition module comprises a power supply terminal 5 for driving the laser diode by using a direct current and a power supply terminal 8 for driving the oscillating circuit 7. Further, it is necessary to provide filters 6, 9 for preventing propagation of a high frequency into each power supply terminal 5, 8. This makes it difficult to scale down the high-frequency superposition module.

When only the power supply for feeding a direct current to the laser diode is turned on or off, the oscillating circuit remains operating thus causing a noise. To prevent this noise, it is necessary to provide a switch for the oscillating circuit 7 separate from the power supply for feeding a direct current to the laser diode. This complicates the configuration of the optical pickup.

SUMMARY OF THE INVENTION

In view of the above problems, an abject of the present invention is to provide a high-frequency superposition module for an optical pickup that reduces the number of devices, facilitates scale-down and allows an oscillating circuit to be turned off when a power supply for feeding a direct current to a laser diode is turned off and an optical pickup using the high-frequency superposition module.

The first aspect of the invention is a high-frequency superposition module for an optical pickup that superposes a high-frequency current on the direct current for a laser diode for an optical pickup and feeds the resulting current, in that an oscillating circuit for feeding the high frequency to the laser diode comprises at least an active element and passive elements and that a power supply for feeding the direct current to the laser diode is also used as a power supply for the oscillating circuit.

In such a high-frequency superposition module, a power supply dedicated to the oscillating circuit is made unnecessary. Thus, a dedicated power supply and power supply terminal and passive elements such as a filter between the power supply terminal and the oscillating circuit can be removed, thereby allowing simplified configuration and scale-down of the module. When the power supply of the laser diode is off, the power supply of the oscillating circuit is also off without generating a noise.

The second aspect of the invention is an optical pickup in that the optical pickup has at least a high-frequency superposition module according to the first aspect of the invention and at least a laser diode driven by the high-frequency superposition module.

In this way, configuring an optical pickup by using the high-frequency superposition module allows scale-down of the high-frequency superposition module itself as well as unifies power circuits for a laser diode into a single circuit.

This simplifies the optical pickup configuration and scales down the optical pickup.

DETAILED DESCRIPTION OF THE PREFERRED EMBODIMENTS

Figure 1A:
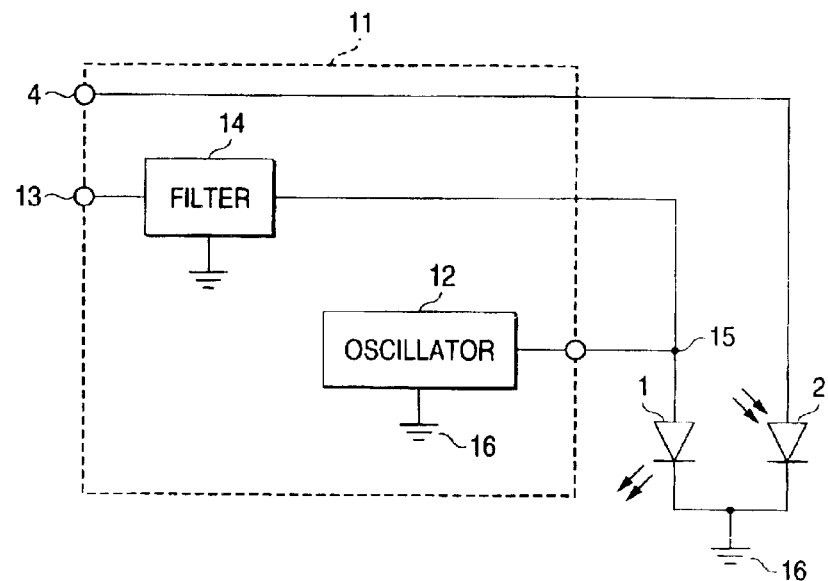
FIG. 1A is a block diagram showing an embodiment of a high-frequency superposition module for an optical pickup according to the invention.
Figure 2:
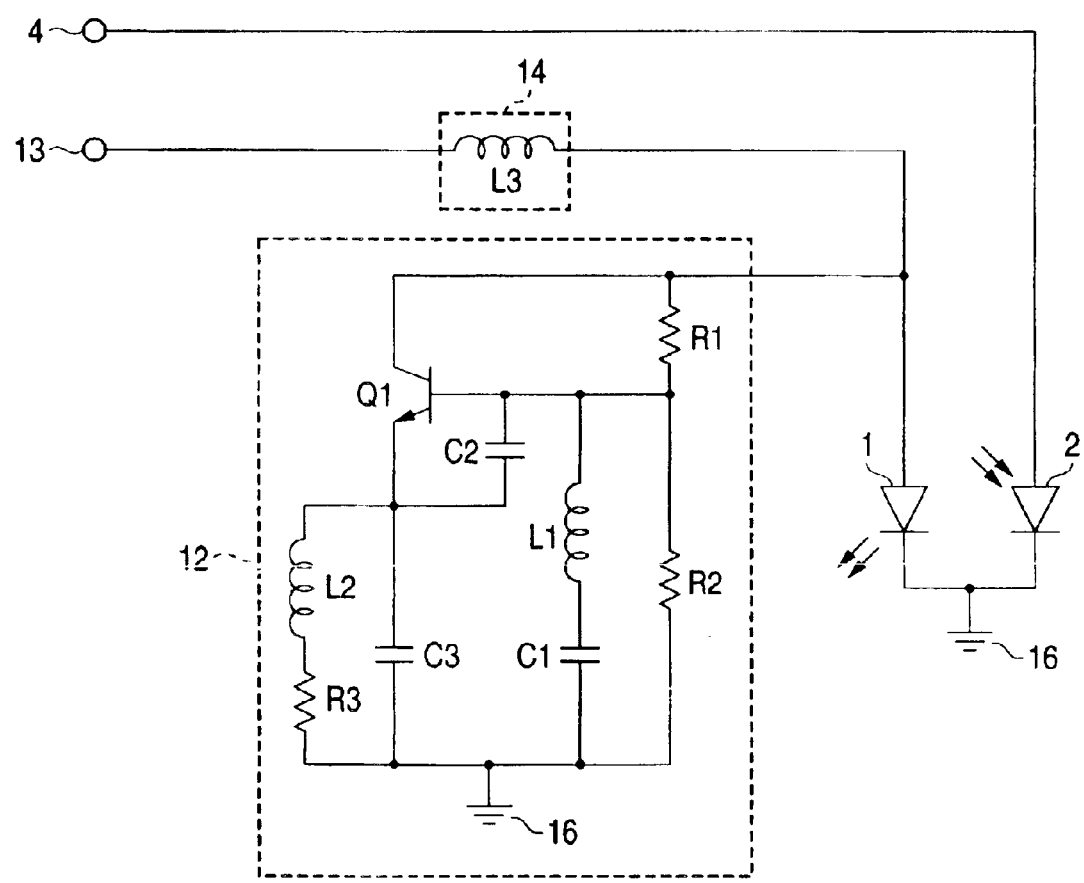
FIG. 2 is a circuit diagram showing the high-frequency superposition module in FIG. 1A.

FIG. 1A is a block diagram showing an embodiment of a high-frequency superposition module for an optical pickup according to the invention. FIG. 2 is a circuit diagram of FIG. 1A. In FIG. 1A and FIG. 2, a numeral 1 represents a laser diode for an optical pickup, 2 a photo-detector diode, 11 a high-frequency superposition module, 4 a power supply terminal for the photo-detector diode, 12 an oscillating circuit, 13 a power supply terminal for feeding a direct current to the laser diode 1 as well as feeding power to the oscillating circuit 12, and 14 a filter for preventing a high frequency generated by the oscillating circuit 12 from being to the power supply.

The oscillating circuit 12 is connected between a connection point 15 between the filter 14 and the laser diode 1 and a ground 16, that is, in parallel with the laser diode 1. The oscillating circuit 12 is composed of an active element consisting of a transistor Q1 and passive elements such as capacitors C1 through C3, inductors L1, L2, and resistors R1 through R3. The oscillating circuit oscillates at a high frequency of several hundreds of megahertz. The filter 14 is composed of an inductor L3.

Figure 1B:
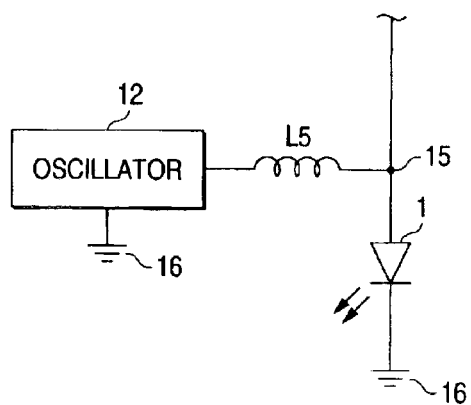
FIG. 1B is a block diagram showing another embodiment of the invention.
Figure 1C:
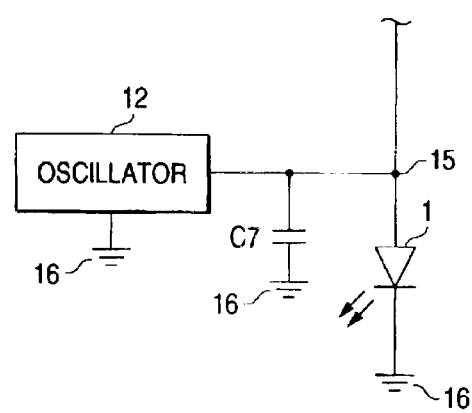
FIG. 1C is a block diagram showing another embodiment of the invention.

In this way, by using the power supply terminal 12 for feeding a direct current and feeding power to the oscillating circuit 12, a power supply dedicated to the oscillating circuit is made unnecessary. This eliminates the need for the power supply terminal 8, the filter 9 between the power supply dedicated to the oscillating circuit and the oscillating circuit as well as wiring for arranging the filter, all of which were necessary in the related art. This simplifies the system configuration and scales down the system. As shown in FIGS. 1B and 1C, an impedance matching circuit such as an inductor L5 and a capacitor C7 may be provided between the oscillating circuit 12 and the laser diode 1.

With a configuration as an optical pickup having at least a high-frequency superposition module of the embodiment and at least a laser diode 1 driven by the high-frequency superposition module and a photo-detector diode 2, the high-frequency superposition module itself can be scaled down and also power circuits for a laser diode are unified into a single circuit. This simplifies the optical pickup configuration and scales down the optical pickup.

Figure 3A:
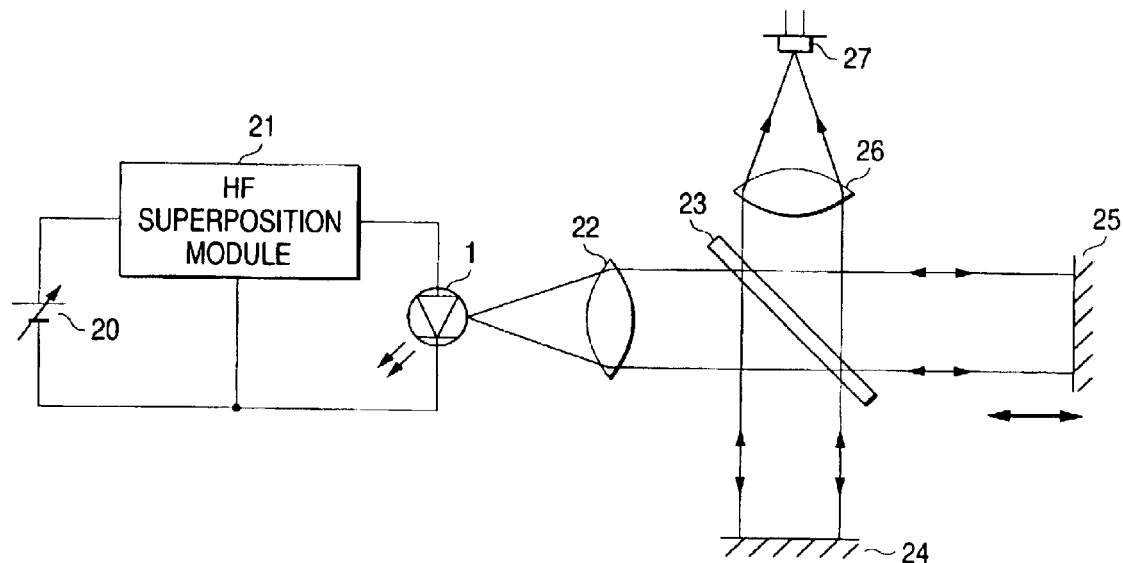
FIG. 3A shows a configuration of apparatus used for measuring the characteristics of a high-frequency superposition module.

Even in a configuration where a single power supply terminal is shared, multimode has been attained as described below. FIG. 3A shows a configuration of a Michelson interferometer for measuring the visibility below.

$$(P\max - P\min)/(P\max + P\min)$$

where Pmax is the maximum value of optical strength, Pmin is the minimum value of optical strength.

In FIG. 3A, a high-frequency superposition module 21 under measurement composed of a related art high-frequency superposition module or a high-frequency superposition module according to the invention is connected to a power supply 20 to drive the laser diode 1. Laser beams generated by the laser diode 1 are made into parallel rays by using a collimator lens. The parallel rays are reflected on a fixed mirror 24 by way of a beam splitter 23 and transmitted to a moving mirror 25. Reflected lights from these mirrors 24, 25 are again unified into a single ray by using the beam splitter 23 and detected by a photo-detector diode 27 via a condenser lens 26.

Figure 3B:
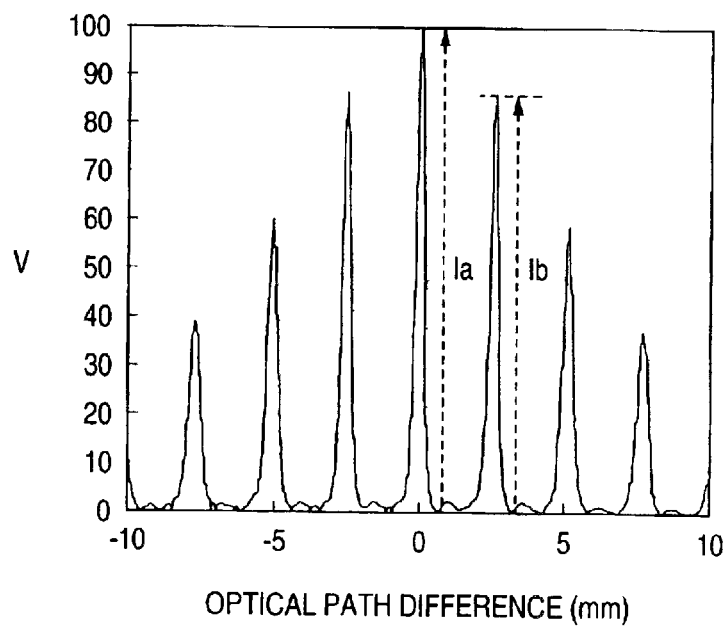
FIG. 3B shows the V-Δ characteristic measured by the apparatus.

In this apparatus, when the moving mirror 25 is shifted in the direction of the optical axis, optical path length of a reflected light from the moving mirror 25 and that of a reflected light from the moving mirror 24 generates an interference via a beam splitter 23. When the moving mirror 25 is continuously shifted to change the optical path length, an interference curve is obtained as shown in FIG. 3B. In a laser diode that oscillates in the longitudinal multimode, the spectrum is not composed of a true single mode by contains several side modes. Thus peaks appear on the envelope of the V-Δ (optical path difference) characteristic as shown in FIG. 3B.

In FIG. 3B, the ratio γ (=Ib/Ia) of a peak Ia of an optical path difference of 0 to the next primary peak Ib is called the damping ratio of visibility V. When γ=1, a light appearing on the laser diode 1 is a complete coherent light (wavelength, phase and wave front are aligned) When γ=0, the light is an incoherent light. That is, the smaller the primary peak value Ib is, the more frequencies are superposed. The system is operating in the multimode.

Figure 4:
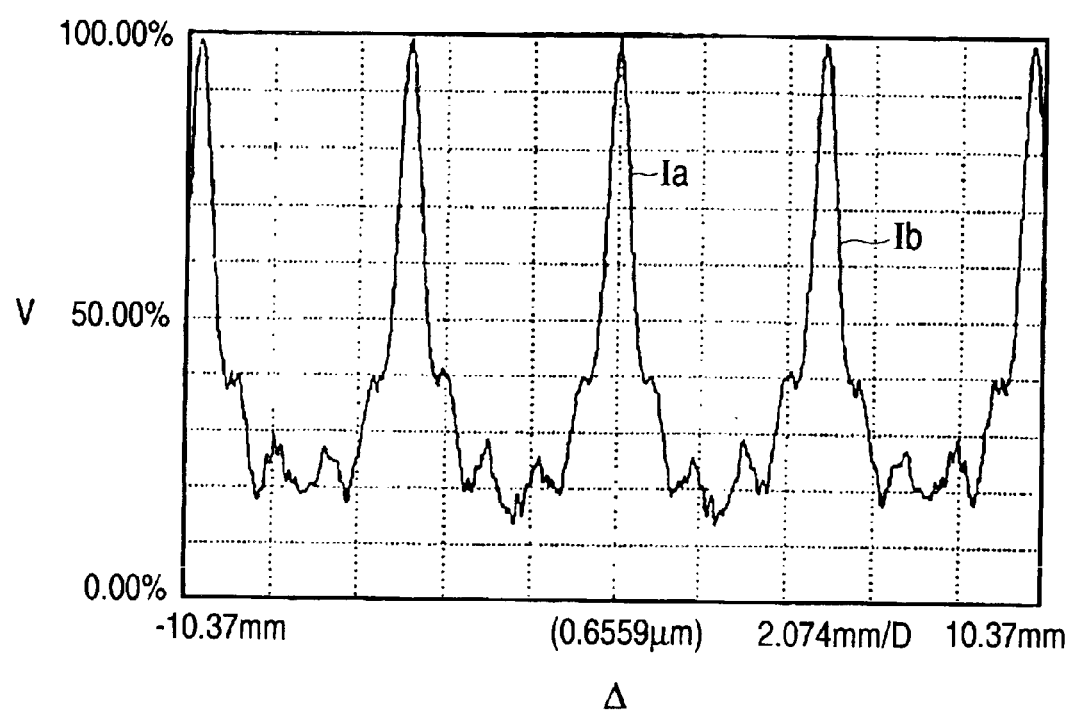
FIG. 4 shows the V-Δ characteristic in the single mode.

Table 1 shows comparison of the γ value between the single mode, a related art article and an article developed according to this invention, and corresponding oscillating frequency and operating power current between the related art article and the article developed according to this invention. FIG. 4 shows the V-Δ characteristic obtained when only a direct current is used to drive the laser diode 1. In this case, the γ value is 98.7% as shown in Table 1.

TABLE 1

Figure 5A:
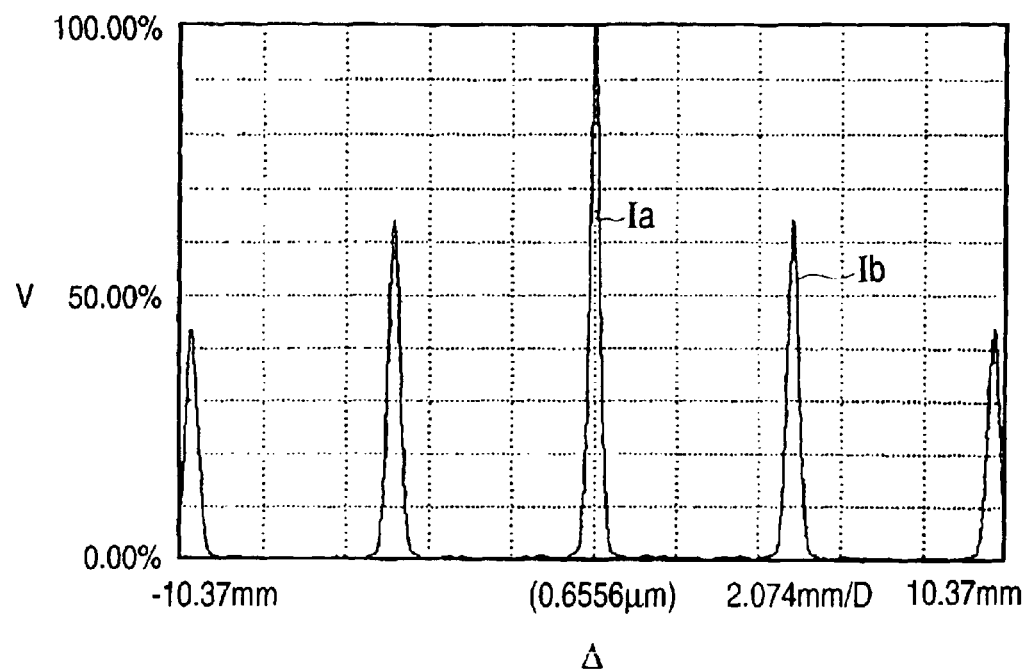
FIG. 5A shows the V-Δ characteristic of a high-frequency superposition module as a related art article.
Figure 5B:
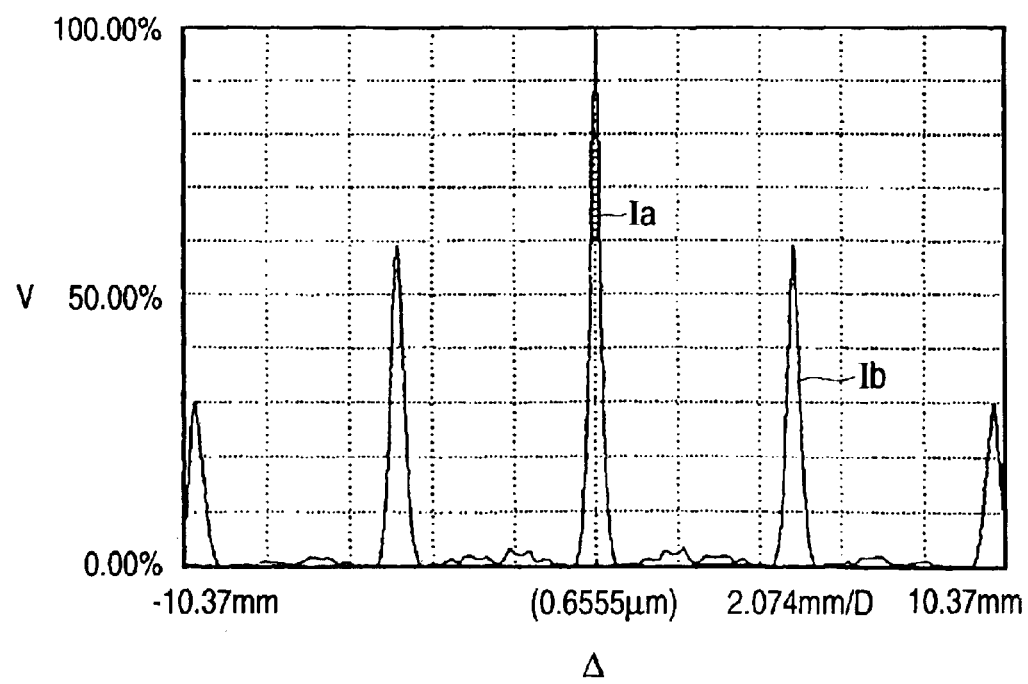
FIG. 5B shows the V-Δ characteristic of a high-frequency superposition module as an inventive article.

| | Superposition amount Coherence primary peak obtained when optical output is 5 mV (%)(γ value) | Oscillating frequency of superposition module (MHz) | Operating power current of superposition current (mA) |
| --- | --- | --- | --- |
| No superposition modules | 98.7 FIG. 4 | | |
| Related art | 66.4 FIG. 5A | 372 | 18 |
| Invention | 59.7 FIG. 5B | 361 | 18 |

Figure 6A:
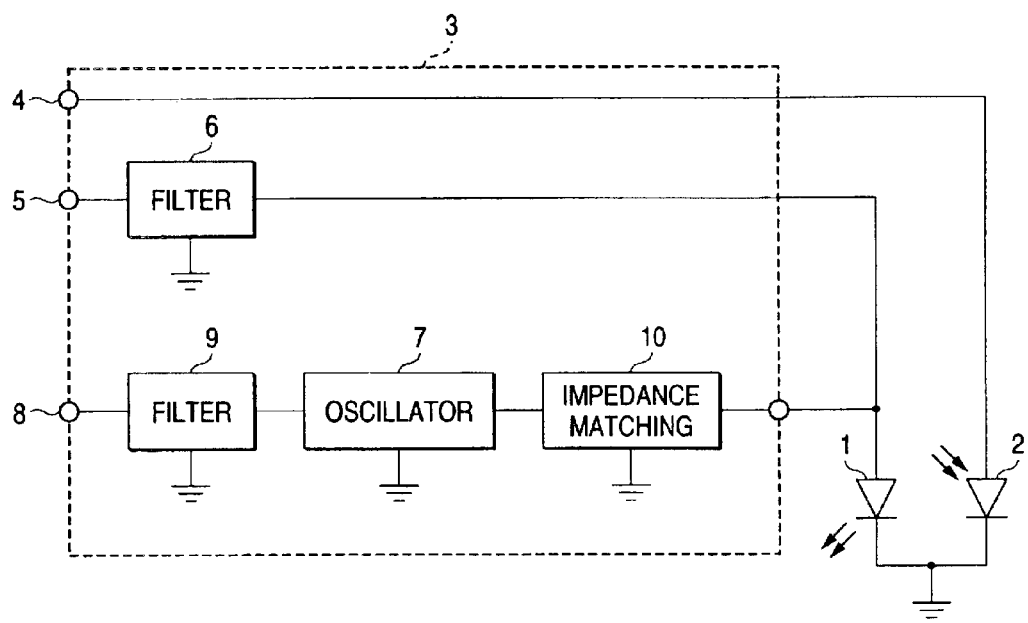
FIG. 6A is a block diagram showing a related art high-frequency superposition module.
Figure 6B:
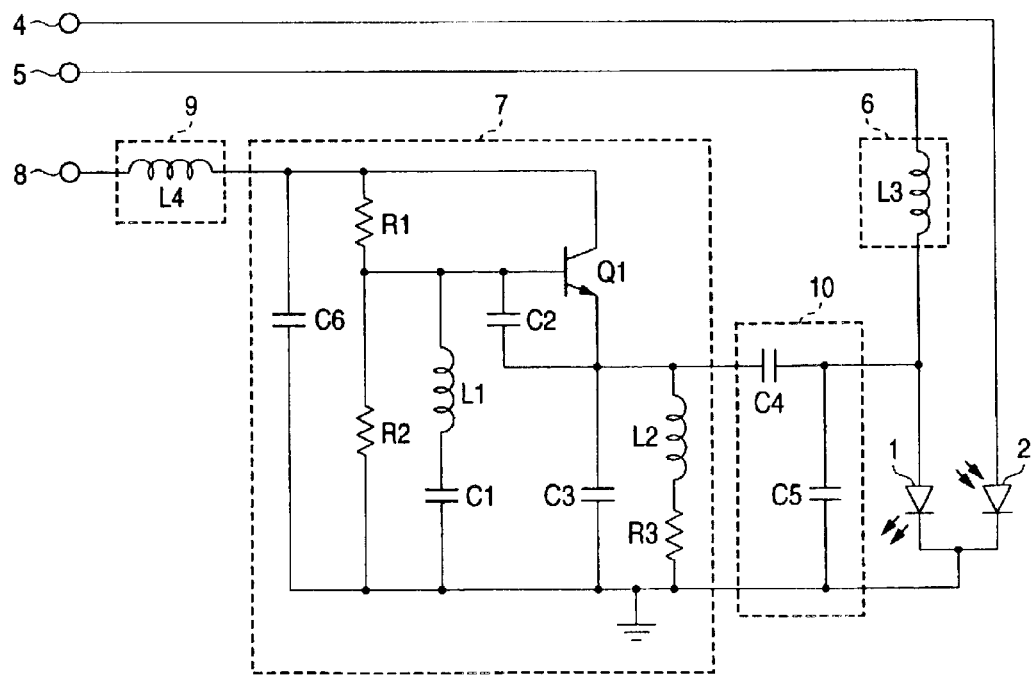
FIG. 6B is a circuit diagram of the high-frequency superposition module in FIG. 6A.

FIG. 5A shows the V-Δ characteristic of a related art high-frequency superposition module shown in FIG. 6 and the corresponding γ value is 64.4%. FIG. 5B shows the V-Δ characteristic of a high-frequency superposition module of the invention shown in FIGS. 1A and 2 and the corresponding γ value is 59.7% from the same operating current as the related art article, showing that more efficient operation is obtained.

According to the first aspect of the invention, a power supply dedicated to an oscillating circuit is made unnecessary. Thus, a dedicated power supply, a power supply terminal, and passive elements such as a filter between the power supply terminal and the oscillating circuit can be removed. This simplifies and scales down the configuration. When the laser diode power is off, the power supply for the high-frequency superposition module is also off thus generating no noise. When the laser diode power is off, the power supply for the oscillating circuit is also off thus generating no noise.

According to the second aspect of the invention, the high-frequency superposition module itself can be scaled down and also power circuits for a laser diode are unified into a single circuit. This simplifies the optical pickup configuration and scales down the optical pickup.

What is claimed is:

1. A high-frequency superposition module for an optical pickup that superposes a high-frequency current on a direct current of a laser diode for the optical pickup, said module comprising:

an oscillating circuit for feeding said high frequency current to said laser diode, which includes at least an active element and passive elements; and a power supply for feeding said direct current to the laser diode which is also used as a power supply for said oscillating circuit.

2. A high-frequency superposition module as claimed in claim 1 further comprising:

an impedance matching circuit being provided between the oscillating circuit and the laser diode.

3. An optical pickup comprising:

a laser diode; and a high-frequency superposition module that superposes a high-frequency current on a direct current of the laser diode, said module comprising:

an oscillating circuit for feeding said high frequency current to said laser diode, which includes at least an active element and passive elements; and a power supply for feeding said direct current to the laser diode which is also used as a power supply for said oscillating circuit, wherein said laser diode is configured to be driven by said high-frequency superposition module.

4. A high-frequency superposition module for an optical pickup, the module comprising:

an oscillating circuit configured to provide a high frequency current to a laser diode, the oscillating circuit comprising an active element and a passive element; and a direct current power supply configured to provide power to the laser diode and to provide power to the oscillating circuit.

5. The high-frequency superposition module according to claim 4, further comprising:

an impedance matching circuit between the oscillating circuit and the laser diode.

6. An optical pickup comprising:

a laser diode; and a high-frequency superposition module configured to superpose a high-frequency current on a direct current to drive the laser diode, the module comprising:

an oscillating circuit configured to provide the high frequency current to the laser diode, the oscillating circuit comprising an active element and a passive element; and a direct current power supply configured to provide the direct current to power the laser diode and to the oscillating circuit.

* * * * *